United States Patent [19]

Kawakami et al.

[11] Patent Number: 5,177,609
[45] Date of Patent: Jan. 5, 1993

[54] VIDEO SIGNAL TIME BASE COMPRESSION APPARATUS

[75] Inventors: Toshikatsu Kawakami, Osaka; Toshimitsu Fujimori, Takatsuki, both of Japan

[73] Assignee: Matsushita Electric Industrial Co., Ltd., Osaka, Japan

[21] Appl. No.: 723,435

[22] Filed: Jun. 28, 1991

[30] Foreign Application Priority Data

Jul. 3, 1990 [JP] Japan .................. 2-176022

[51] Int. Cl.$^5$ .............................................. H04N 7/01
[52] U.S. Cl. .................................. 358/140; 358/160
[58] Field of Search ............... 358/140, 160, 11, 138, 358/180

[56] References Cited

U.S. PATENT DOCUMENTS

| | | | |
|---|---|---|---|
| 4,605,962 | 8/1986 | Christopher et al. | 358/140 |
| 4,719,509 | 1/1988 | Sakamoto | 358/140 |
| 4,901,148 | 2/1990 | Nakagama et al. | 358/140 |
| 4,953,025 | 8/1990 | Saitoh et al. | 358/140 |

FOREIGN PATENT DOCUMENTS 0163513 12/1985 European Pat. Off. .
0213912 3/1987 European Pat. Off. .

OTHER PUBLICATIONS

J-C Guillon, "Multi-feature, Multi-format 16/9 TV Set," Conference and Exhibition on Television Techniques, 12-14, vol. 2, pp. 55-62, Jun. 1990.

Primary Examiner—Victor R. Kostak
Attorney, Agent, or Firm—Stevens, Davis, Miller & Mosher

[57] ABSTRACT

A video signal processing apparatus is provided which can be used when a transmitted video signal is displayed on a screen or a CRT having an aspect ratio (e.g. 9:16) different from an aspect ration (e.g. 4:3) of the transmitted video signal. When the video signal is time-base-compressed and displayed on the screen or CRT, a memory is used to store the digitally converted video signal. The video signal is written into the memory every two scan periods and is read out of the memory every two scan periods, thereby executing a double-speed scan conversion and also enabling time-base-compression to be performed. Accordingly, an optimum display state of video signals of various aspect ratios can be obtained by a small number of memory elements.

3 Claims, 8 Drawing Sheets

VIDEO SIGNAL TIME BASE COMPRESSION APPARATUS

BACKGROUND OF THE INVENTION

The invention relates to a video signal processing apparatus in an image display apparatus which can display a video image having a different aspect ratio onto a screen or a cathode ray tube (hereinafter, abbreviated to a CRT) of a wide aspect of 9:16 of a high definition television receiver, a video projection system (hereinafter, abbreviated to a VPS), or the like. When a video image having such a different aspect ratio is displayed, the invention enables such a video image to be displayed as large as possible.

In recent years, as the number of video softwares, particularly, softwares of movies has been increased, the number of softwares of the vista size or cinema size also increases. If such a video software is displayed onto the CRT having an aspect ratio of 3:4 of the television receiver of the NTSC system, blanks occur in the upper and lower portions of the screen. The number of video images of the wide aspect ratio for the high definition television receiver or the like will increase in future. Therefore, an efficient display method is being examined.

FIG. 1 is a schematic block diagram of a clear vision (EDTV: Extended Definition Television).

In the diagram, reference numeral 1 denotes a selector for selecting and outputting one of a plurality of video sources $V_1$ to $V_4$; 2 an AGC circuit to always keep an amplitude of a video (luminance) signal constant; 3 a chroma demodulating circuit to demodulate a chrominance signal included in the video signal; 4 an A/D converting circuit to analog-digital convert the video (luminance) signal and the chrominance signals; 5 a signal processing circuit to produce interpolation signals which are necessary for the three-dimensional Y/C separation, motion detection, and double-speed sequential scan which are needed to the EDTV; 6 a memory circuit to execute the double-speed sequential scan; 7 a PLL circuit to generate clocks for the A/D conversion and clocks necessary for the double-speed sequential scan; 8 a control circuit which receives an output of the PLL circuit 7 and produces various kinds of control signals; 9 a D/A converting circuit to convert a digital video signal which has been converted into a double-speed signal by the memory circuit 6 into an analog signal; and 10 a matrix circuit to convert D/A converted luminance signal (2Y) and chrominance signals (2I, 2Q) into primary color signals of R, G, and B.

The operation of the EDTV constructed as mentioned above will now be briefly described hereinbelow.

One of the video signals in the video source selected by the selector 1 is supplied as a luminance signal to the AGC circuit 2 and is subjected to the AGC so as to make an output amplitude constant and, thereafter, the signal is sent to the A/D converter 4. The one of the video signals is supplied as a chrominance signal (C signal) to the chroma demodulating circuit 3 and is demodulated into an I (R-Y) signal and a Q (B-Y) signal. The I and Q signals are similarly sent to the A/D converting circuit 4.

The one of the video signals is supplied as a sync signal to the PLL circuit 7, by which the oscillation is executed at a frequency of 28.6 MHz ($=8f_{sc}$·$f_{sc}=3.579545$ MHz) as fundamental clocks which are necessary for the double-speed sequential scan, thereby accomplishing the phase lock with a horizontal sync signal.

The A/D converting circuit 4 quantizes and converts the luminance signal into the digital signal at 14.3 MHz ($4f_{sc}$) on the basis of 8 bits and 256 gradations. The A/D converting circuit 4 quantizes and converts the C signal into the digital signal at 3.58 MHz ($f_{sc}$)) on the basis of 7 bits and 128 gradations. The signal processing circuit 5 receives output signals of the A/D converting circuit 4 and executes various kinds of processes to realize a high picture quality and produces interpolation signals which are necessary for the three-dimensional Y/C separation, motion detection, and double-speed sequential scan. In the above case, the signal processing circuit 5 generates the luminance signal and the chrominance signal of the present line and the luminance signal and the chrominance signal of the interpolation line. The horizontal frequency until the above stage is set to 15.75 kHz.

The memory circuit 6 is a circuit which is necessary to execute the double-speed sequential scan by receiving the processes of the signal processing circuit 4. The writing operation into the memory is executed every scan (1H) by the clocks of 14.3 MHz. The reading operation from the memory is performed at a frequency of 28.6 MHz by alternately reading out data from the present line and the interpolation line. By synthesizing both of the data which have been read out, the double-speed sequential scan is realized. In the above process, the horizontal frequency is set to 31.5 kHz.

The control circuit 8 generates various control signals to execute the above operations.

The digital data of the video signal whose speed has been doubled by the memory circuit 6 is supplied to the D/A converting circuit 9 and is converted into the analog signal, so that the luminance signal 2Y and the chrominance signals 2I and 2Q are generated. By receiving those signals, the matrix circuit 10 converts them into the primary color signals of R, G and B.

By supplying those RGB output signals to the screen of the CRT or VPS, a clear video image without a line flicker and a dot interference is displayed.

The EDTV as mentioned above can have the following functions.

Ordinarily, in the video signal of the NTSC system, the aspect ratio is set to 4:3. However, there is considered a function such that the size in the horizontal direction of the video image is compressed into 12/16 as shown in FIG. 2 and the video image having the aspect ratio of 4:3 is displayed on the CRT or screen which has been deflected at a wide aspect ratio such as 9:16 or the like. If the video signal of the aspect ratio of 4:3 is directly displayed by the TV receiver having the aspect ratio of 9:16, the video image which has been compressed in the vertical direction is displayed.

As such compressing means can be realized by changing a horizontal deflection current (changing an amplitude) or can be also electrically realized by using memories.

FIG. 3 shows a block diagram of a compression processing circuit using memories. Explanation will now be made with respect to the luminance signal. The same shall also apply to the chrominance signal.

Reference numerals 61 and 64 denote simple memories for the double-speed scan. The memory circuit 6 in FIG. 1 has the above construction. Reference numerals.

62, 63, 65, and 66 denote memories to further compress the double-speed data. The reason why two memories are provided for each of the memories 61 and 64 is because the data is divided into the halves and processed since the operating speed cannot be accomplished by the single memory (the reading speed is higher than the writing speed). Reference numeral 67 denotes a control circuit to control the writing and reading operations for the memories 62, 63, 65, and 66; 68 a synthesizing circuit to synthesize outputs of the memories 62, 63, 65, and 66; and 69 a switching circuit for switching the double-speed data from the memories 61 and 64 and the compression data from the synthesizing circuit 68 and for generating either of the those data.

The operation will now be briefly explained hereinbelow with reference to timing charts of FIGS. 5 and 6.

First, as a memory, there is used a line memory of the FiFo type of (910 bits×8) of μPD42101C made by NEC Corporation shown in FIG. 4 in which the writing and reading operations can be fundamentally asynchronously executed. In FIG. 4, WCK denotes a write clock signal; RCK a read clock signal; WE a write enable signal; RE a read enable signal; WRST a write reset signal; and RRST a read reset signal. Those signals are obtained from the control circuits 67 and 80.

The relation between the quantizing frequency ($4f_{sc}$) and a horizontal frequency ($f_h=15.75$ kHz) is set to just 910. Address counters are independently provided for writing and for reading and are reset to 0 by the reset signals (write: WRST, read: RRST) and automatically count clocks until 910. The ordinary double-speed conversion is executed in the following manner. As shown in FIG. 6, after the address counters of the memories 61 and 64 were reset by the write reset signals WRST, the present line signal (present·Y) of a 15.75 kHz rate is written into the memory 61 and the interpolation line signal (interpolation·Y) is written into the memory 64 by the clocks WCK of 14.3 MHz )$4f_{sc}$) by the signal processing circuit 5. On the other hand, after the memories 61 and 64 were reset by the read reset signal RRST with a delay time of 0.5H, the reading operations are alternately performed by the clocks RCK of 28.6 MHz ($8f_{sc}$) and the present read enable signal REAL and the interpolation read enable signal REAL. 2 present·$Y_s$ and 2 interpolation·$Y_s$ are obtained for 1H period of time and are synthesized, thereby obtaining a double-speed converted luminance signal $2Y_s$.

FIG. 6 shows the case of further compressing. The double-speed converted luminance signals (2 present·$Y_s$, 2 interpolation·$Y_s$) are written by the clocks of $8f_{sc}=28.6$ MHz (actually, the clock frequency is set to $4f_{sc}=14.3$ MHz in consideration of the speed of the memory and, as mentioned above, the memory for the present line and the memory for the interpolation line are independently provided and the processes are executed) and are read out by the clocks $f_w$ higher than the above frequency. To display the video image of the aspect ratio of 4:3 as shown in FIG. 2, the reading clock $f_w$ is set to $8f_{sc} \times 16/12$ [MHz]. Further, by controlling by the read enable signal present RE and read enable signal interpolation RE each having a width of 910 bits in a manner such that the read-out image is located at the center of the screen of the CRT, a luminance signal $2Y_w$ whose time base has been compressed can be obtained.

In the conventional example, the reason why the circuit for the double-speed sequential scan and the circuit for the time base compression are independently provided is because there is a limitation in the reading speed in order to execute the reading operation earlier than the writing operation (so that the reading operation does not outrun the writing operation). The number of memories is large and a peripheral construction is also complicated.

SUMMARY OF THE INVENTION

In consideration of the above subjects, it is an object of the invention to provide a video signal processing apparatus in which a circuit for the simple double speed and a circuit for the time base compression which have independently been executed are constructed as a single circuit and the number of memories is reduced and a circuit construction is simplified.

To solve the above subjects, according to a video signal processing apparatus of the invention, the writing operation into a memory is processed every 2H and the reading operation from the memory is also processed every 2H, so that the circuit for the simple double-speed and the circuit for the time base compression which have independently been executed can be constructed as a single circuit, the number of memories which are used can be reduced, and the peripheral circuit construction can be simplified.

According to the invention, by using the above construction, the number of memories which are used is reduced, the peripheral circuit construction can be efficiently realized, and it is possible to contribute to a decrease in costs.

DESCRIPTION OF THE PREFERRED EMBODIMENTS

An embodiment of the invention will be described hereinbelow with reference to the drawings.

Figure 7:
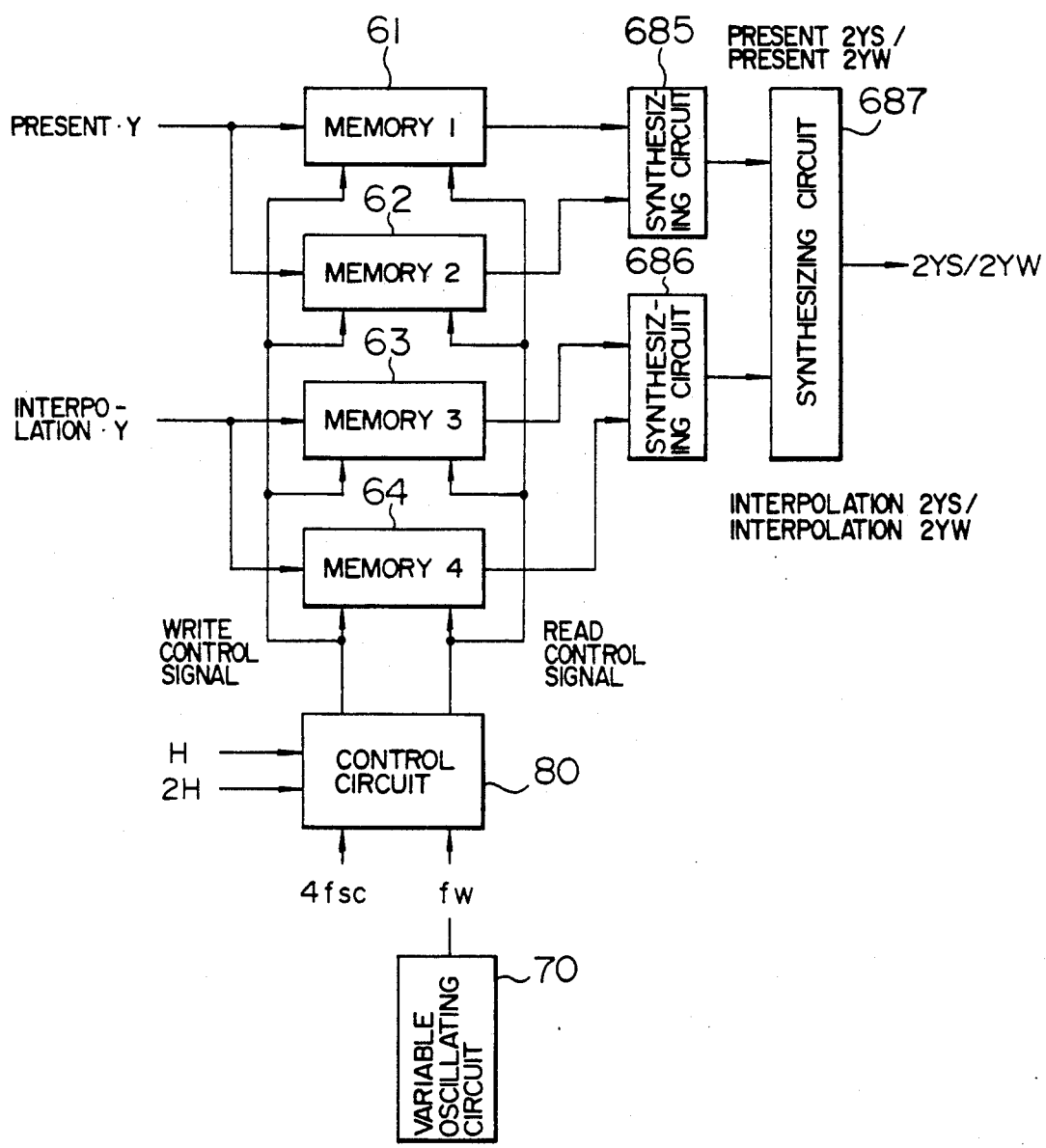
FIG. 7 is a schematic block diagram of a video signal processing apparatus in an embodiment of the invention.

FIG. 7 is a block diagram of a video signal processing apparatus in an embodiment of the invention.

Reference numerals 61 and 62 denote the 1-line memories for speed conversion of a present line signal; 63 and 64 the 1-line memories for speed conversion of an interpolation line signal; 685 a synthesizing circuit of outputs of the memories 61 and 62; 686 a synthesizing circuit of outputs of the memories 63 and 64; 687 a synthesizing circuit of outputs of the synthesizing circuits 65 and 66; 70 a variable oscillating circuit to variable generate the read clocks $f_w$; and 80 the control circuit to control the memories 61 to 64.

Figure 8:
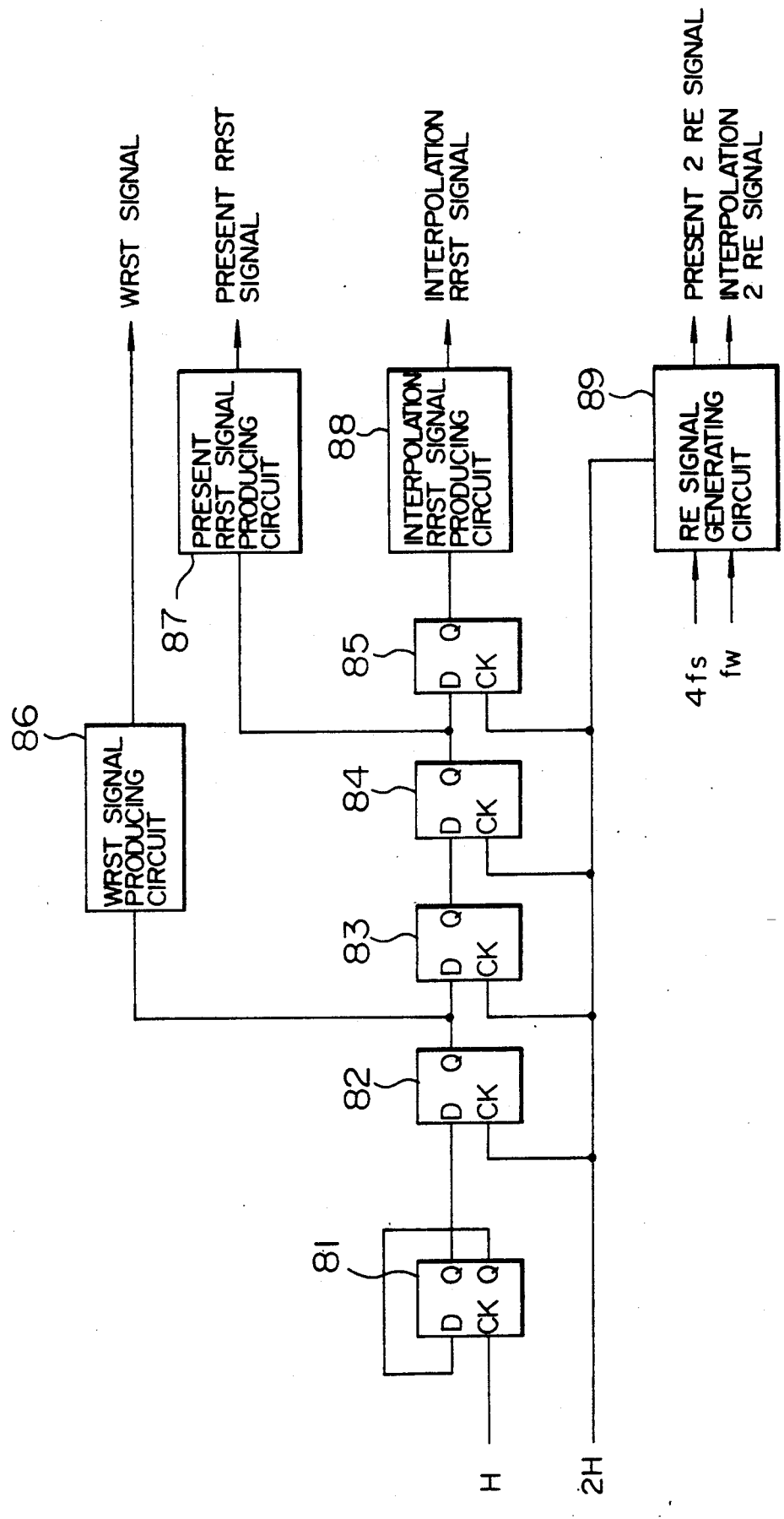
FIG. 8 is a timing generating circuit diagram in a control circuit.

Even-number designated bits in the digital data of the present line signal are written into the memory 61, for instance, while odd-number designated bits are written into the memory 62. The same shall also apply to the memories 63 and 64 for the interpolation line signal. Control signals from the control circuit 80 are derived from a circuit construction as shown in FIG. 8. Reference numeral 81 denotes a frequency divider to divide a horizontal sync signal H into ½; 82 to 85 shift registers to shift an output of the frequency divider 81 at a period which is twice as large as that of the horizontal sync signal H; 86 a circuit to produce the write reset signal WRST; 87 a circuit to produce the read reset signal RRST of the present line data; and 88 the circuit to produce the read reset signal RRST of the interpolation line data. Those signal producing circuits produce the respective signals in accordance with the use of the memory. Reference numeral 89 denotes an RE signal generating circuit to produce the read enable (RE) signal to control the reading operations of the memories 61 to 64.

Figure 9:
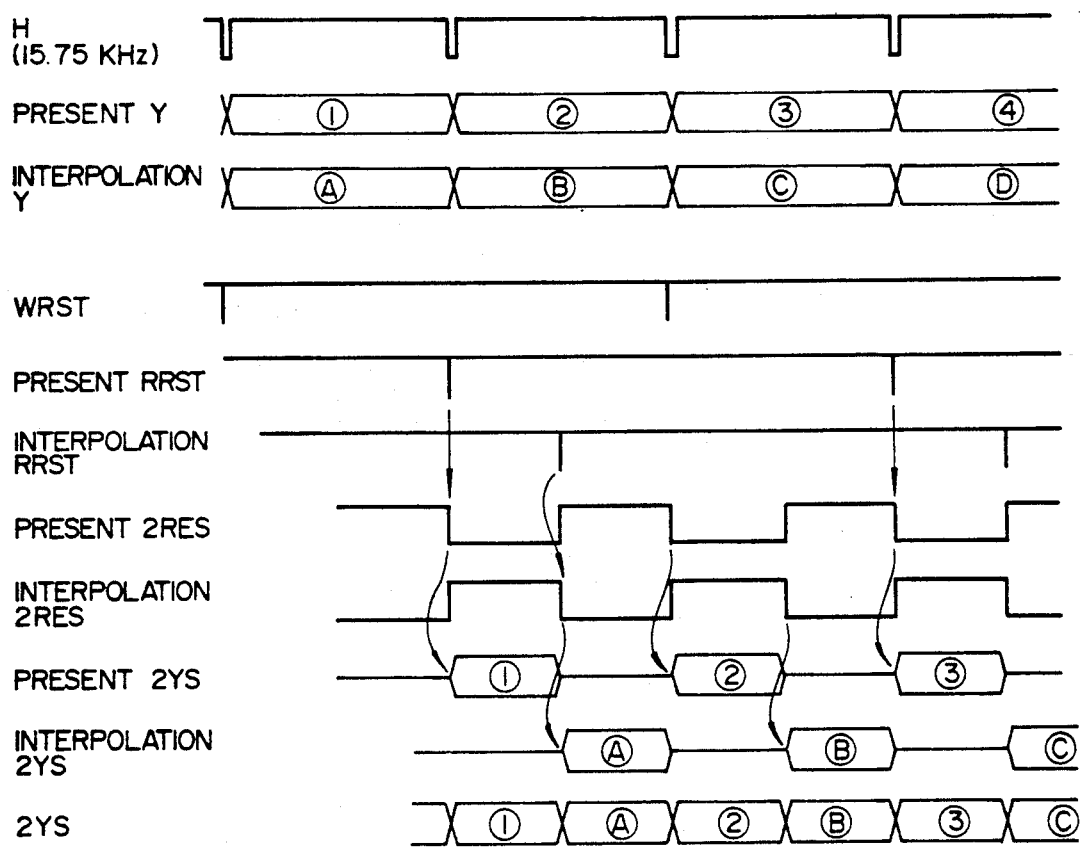
FIGS. 9 and 10 show a timing chart of the video signal processing apparatus.
Figure 10:
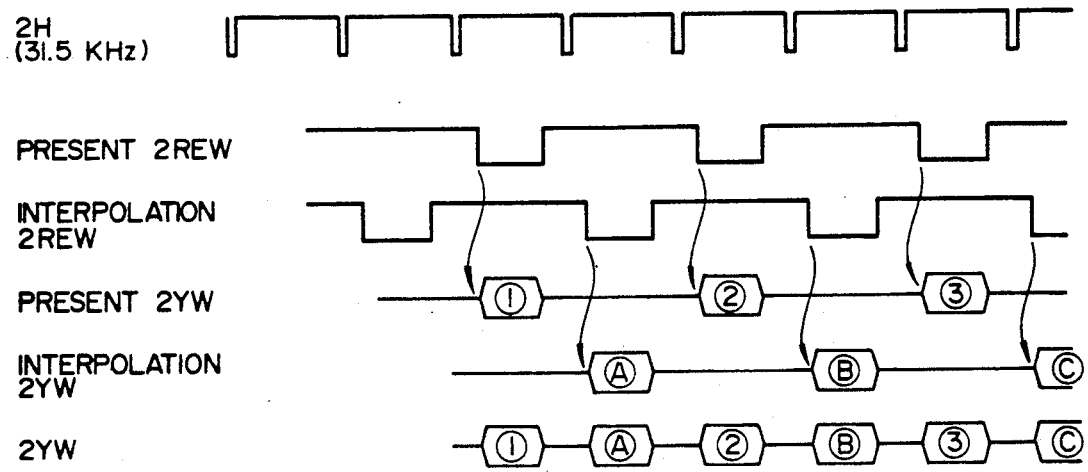

The operation of the video signal processing apparatus constructed as mentioned above will now be described hereinbelow on the basis of timing charts shown in FIGS. 8 and 10. FIG. 9 shows waveforms in the case where, for instance, a video image of the aspect ratio of 4:3 is double-speed converted and is fully displayed onto the CRT screen of the aspect ratio of 9:16.

The present line signal (present Y) and the interpolation line signal (interpolation Y) which have been processed and generated by the signal processing circuit 5 are written into the memories 61 to 64, which are reset by the write reset signal WRST every 2H, by the clocks of 14.3 MHz ($=4f_{sc}$) (actually, 7.15 MHz in consideration of the relation of the operating frequency of the memory).

The reading operations of the memories 61 to 64 are executed by using the present read reset signal present RRST which is generated every 2H with a delay time of 1H from the write reset signal WRST and by using the interpolation read reset signal interpolation RRST which is further delayed by 0.5H from the present RRST. At this time, since the present line data and the interpolation line data are controlled by the read enable signals RE (present 2RES and interpolation 2RES), they are read out by the clock frequency $f_w = 28.6$ MHz ($8f_{sc}$) or 14.3 MHz every 910 dots and every 0.5H and are synthesized by the synthesizing circuits 685 and 686. Thus, the present line signal (present $2Y_s$) and the interpolation line signal (interpolation $2Y_s$) which have been double-speed converted can be obtained as outputs. Further, by synthesizing them by the synthesizing circuit 687, the final video signal $2Y_s$ can be obtained.

Figure 1:
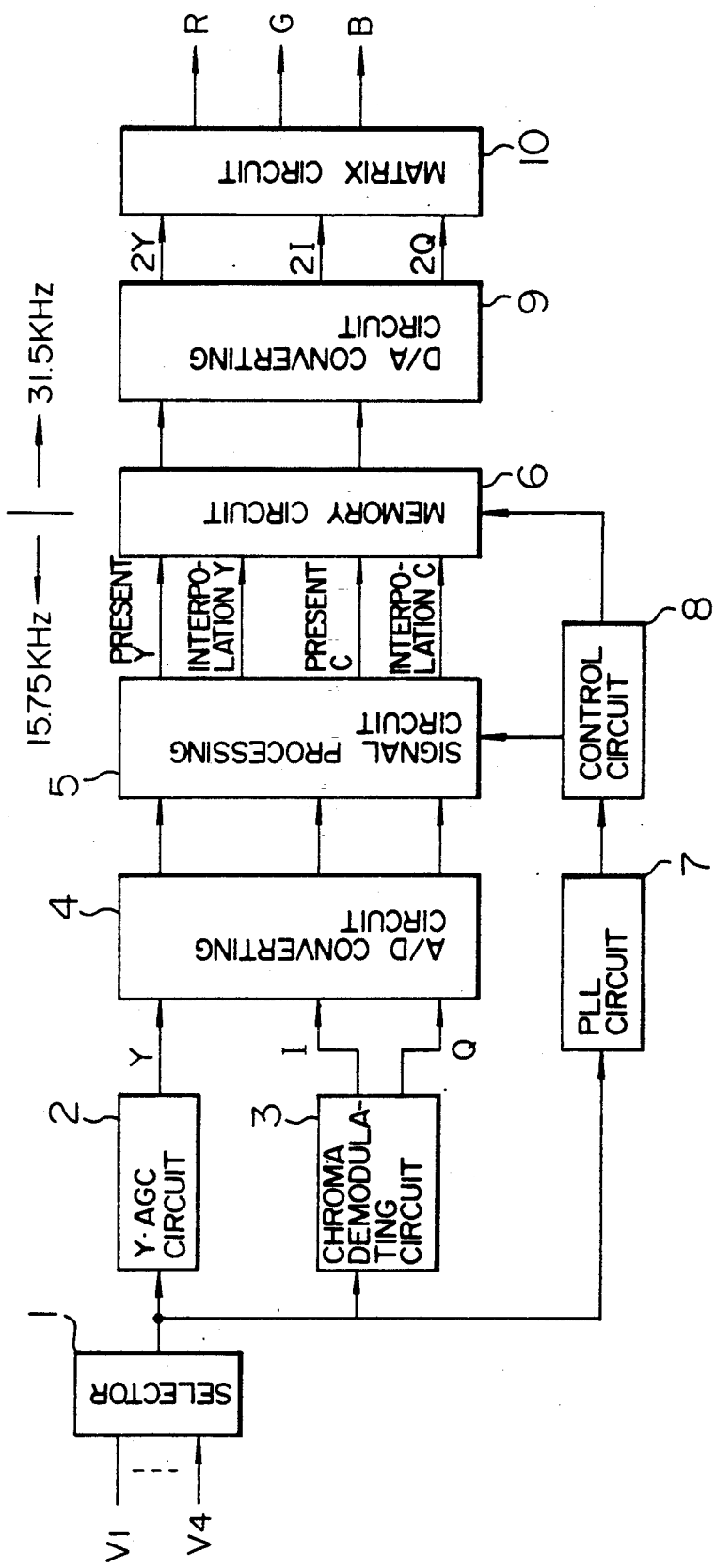
FIG. 1 is a schematic diagram of an EDTV of a conventional example.
Figure 2:
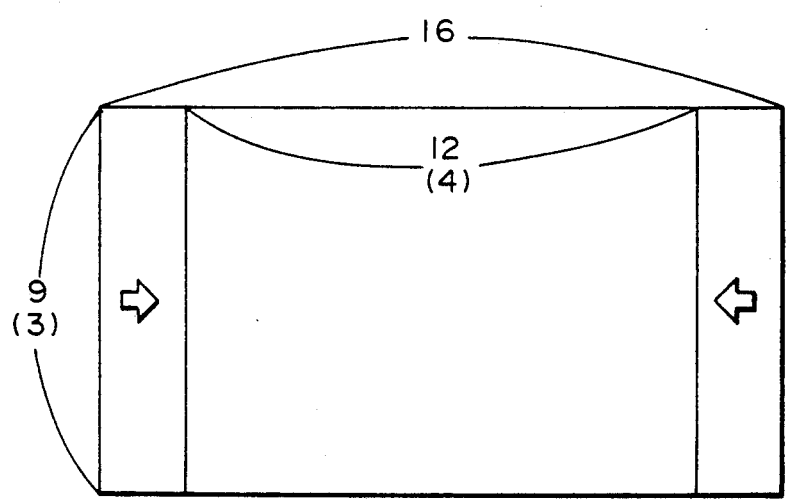
FIG. 2 is a concept diagram in the case where a picture plane of an aspect ratio of 3:4 has been displayed on a screen of an aspect ratio of 9:16.
Figure 3:
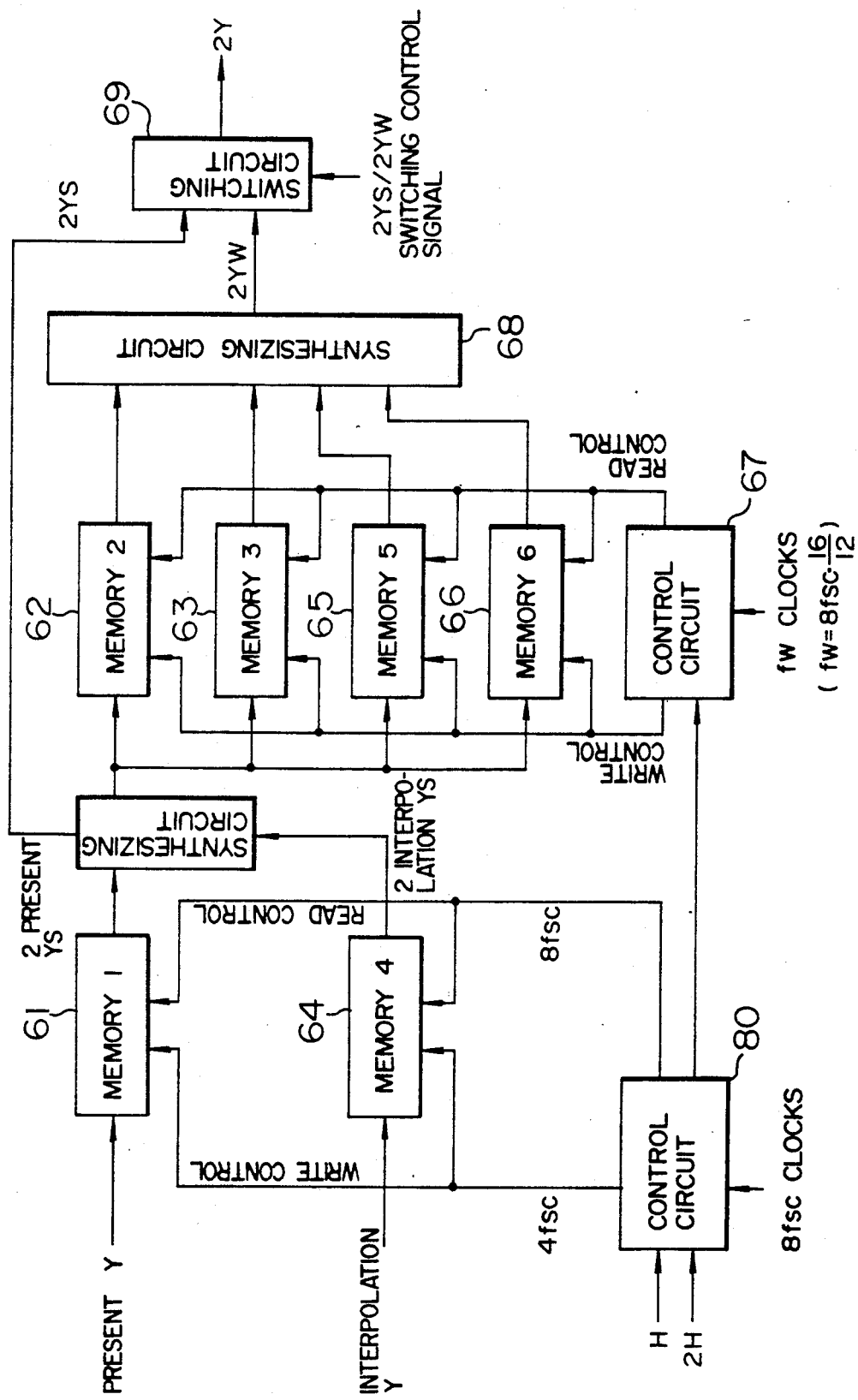
FIG. 3 is a practical circuit diagram.
Figure 4:
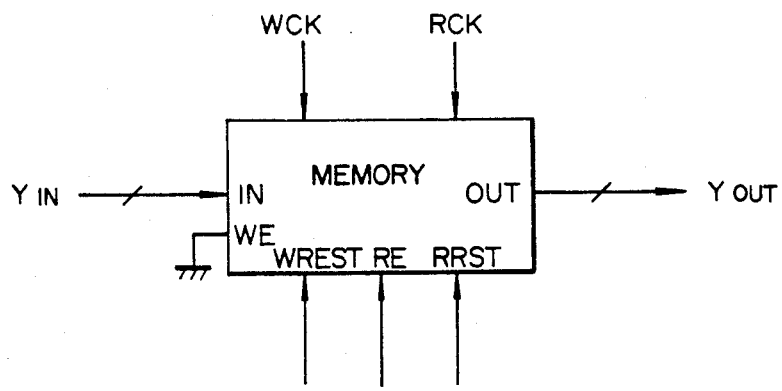
FIG. 4 is a terminal diagram of a memory.
Figure 5:
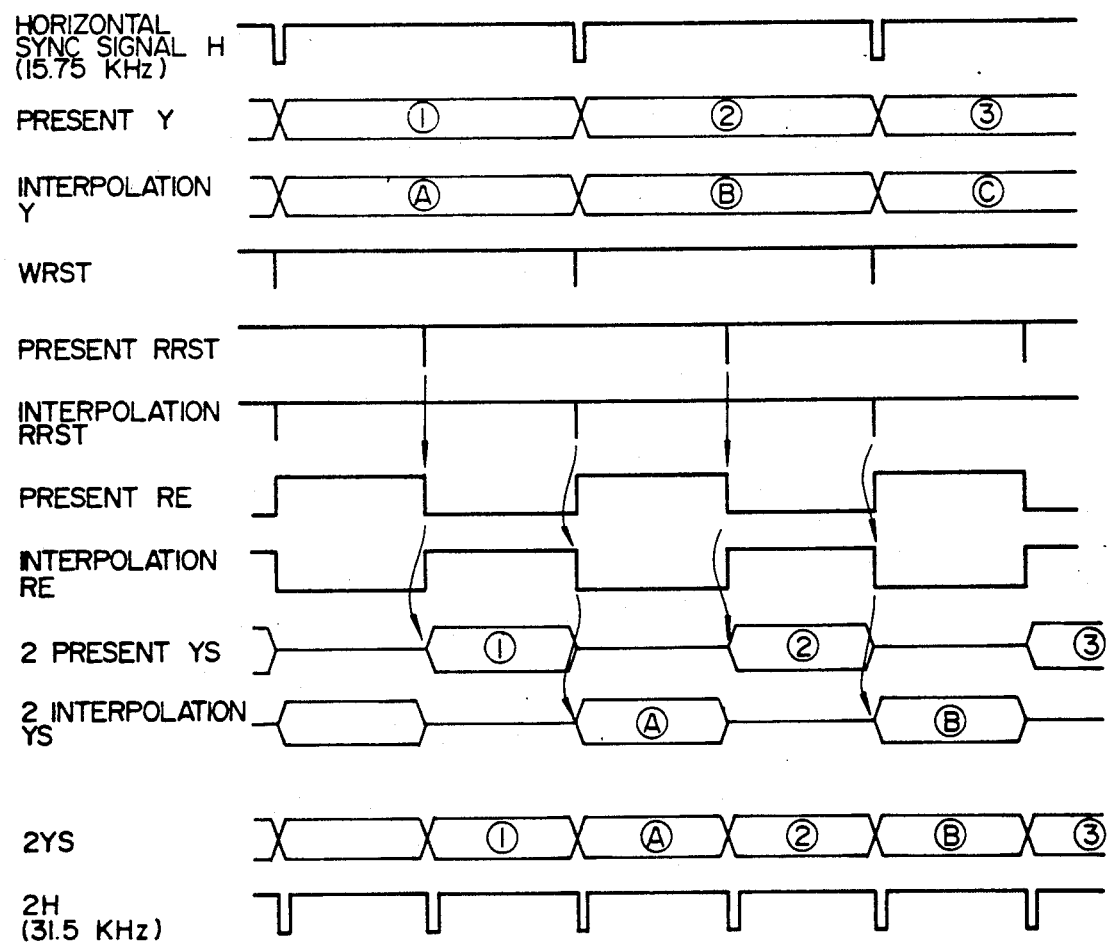
FIG. 5 is a timing chart of a double scan conversion in the conventional example.
Figure 6:
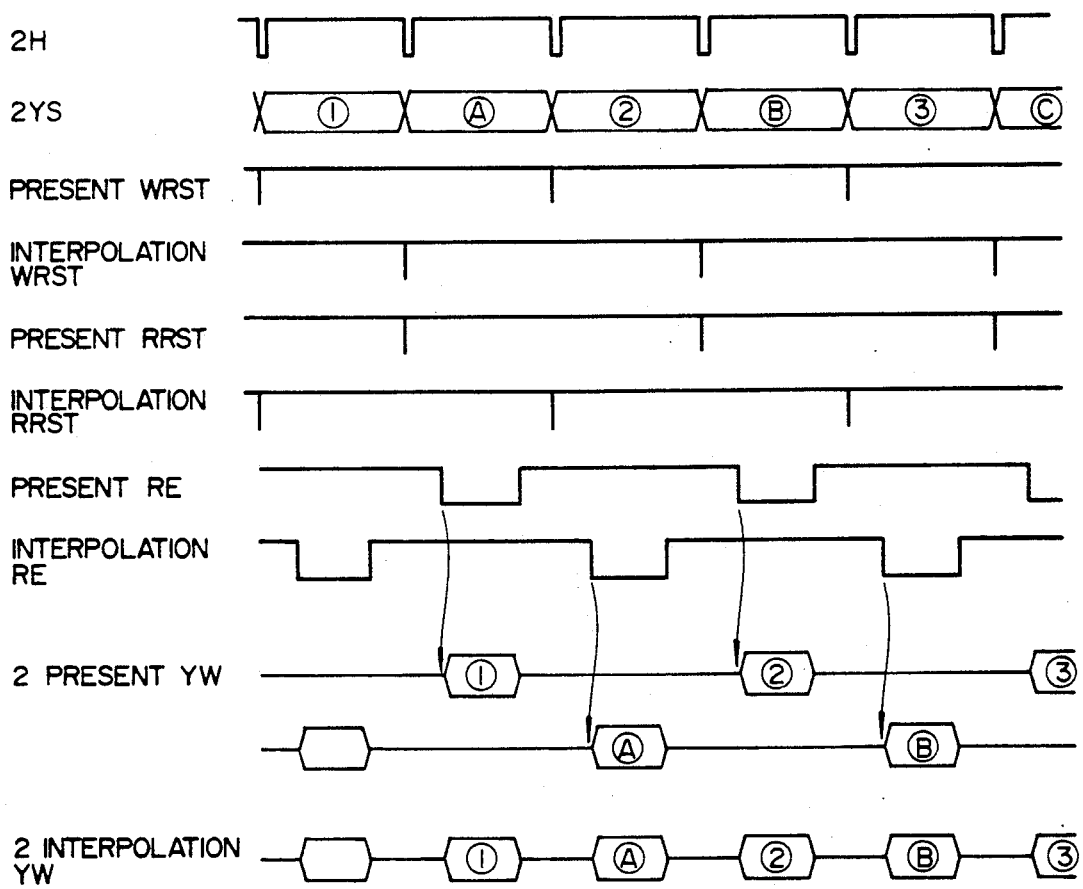
FIG. 6 is a timing chart of a compression scan higher than the double scan in the conventional example.

By changing the frequency of the read clocks $f_w$, the video signal can be compressed and displayed. FIG. 10 shows waveforms in the case where the read clock frequency $f_w$ is set to ($f_w = 8f_{sc} \times 16/12$) and the video image of the aspect ratio of 4:3 is compressed and displayed onto the screen of the aspect ratio of 9:16 as shown in, for example, FIG. 2.

The read clock frequency $f_w$ is different from that in FIG. 9 and the widths and the generating positions of the read enable signals (present 2REW, interpolation 2REW) differ from those in FIG. 9. The write reset signal WRST and the read reset signals (present RRST, interpolation RRST) are similar to those in FIG. 9.

The processes such that after the video data was written, it is read out 1H later denote that the data has already been written by an amount of 1H. Therefore, even if the data is compressed and read out, no problem will occur.

On the other hand, the read enable signal for the present line signal and the read enable signal for the interpolation line signal are alternately generated. The read enable signals RE are obtained by counting 910 clocks. As the clock frequency rises, the widths of the read enable signals RE are narrowed. Therefore, by making the count start position variable, the picture plane is always located at the center of the CRT irrespective of the clock frequency.

By synthesizing the data from the memories 61 to 64 by the synthesizing circuits 685, 686, and 687, the double-speed converted video signal $2Y_s$ or the video signal $2Y_w$ which had been double-speed converted and, further, has been compressed thereafter is obtained.

By the above construction, the number of memories can be reduced and not only the simple double-speed but also the further compression can be executed. Since the compression is performed by also including the sync signal, it is impossible to set to 31.5 kHz in such a state. Therefore, only the video signal component in the compressed data is left and the sync signal and the portion which lacked due to the compression are replaced to the other data.

In the embodiment, four 1-line memories have been used. However, if one 2-line memory is used for the present line signal and one 2-line memory is used for the interpolation signal, the number of memories can be further reduced. There is no need to use the synthesizing circuits 65 and 66 and the circuit construction can be further simplified.

As described above, according to the invention, the double-speed scan conversion and, further, the compression conversion at an arbitrary reading speed can be realized by the same circuit. The number of memories can be reduced and the peripheral circuit construction can be simplified.

We claim:

1. A video signal processing apparatus comprising:
    an analog-digital converter for analog-digital converting a television signal to output a digitally converted television signal;
    a signal processing circuit for processing the digitally converted television signal to provide an output signal having an enhanced picture quality;
    memory means which is used when said output signal of said signal processing circuit is double-speed sequential scanned;
    clock generating means for reading out data from the memory means at an arbitrary speed; and
    control means for executing a writing operation every two scan periods and a reading operation every two scan periods for the memory means,
    characterized in that by changing read clocks of the clock generating means, a time base compression ratio on the reading side can be arbitrarily set.

2. A video signal processing apparatus according to claim 1, wherein said memory means has first and second memories for a present video signal which is generated from said signal processing circuit and also has third and fourth memories for an interpolation video signal, and the clock generating means and the control means can generate read clocks of a frequency which is twice as high as a frequency of write clocks and also generate read clocks of a frequency higher than said double frequency.

3. A video signal processing apparatus according to claim 1, wherein said control means has a function which can adjust a position in the horizontal direction of the video signal which has been read out for a display section.

* * * * *